United States Patent
Klindt

(10) Patent No.: US 10,486,609 B2
(45) Date of Patent: Nov. 26, 2019

(54) ADAPTER FOR SUPPORTING AN APPARATUS ON A VEHICLE TOW HIGH ASSEMBLY

(76) Inventor: Jan R. Klindt, Auberry, CA (US)

( * ) Notice: Subject to any disclaimer, the term of this patent is extended or adjusted under 35 U.S.C. 154(b) by 0 days.

(21) Appl. No.: 13/015,452

(22) Filed: Jan. 27, 2011

(65) Prior Publication Data

US 2019/0106061 A1  Apr. 11, 2019

(51) Int. Cl.
*B60D 1/07* (2006.01)
*B60R 9/06* (2006.01)
*B60R 9/10* (2006.01)
*B60D 1/58* (2006.01)

(52) U.S. Cl.
CPC ............ *B60R 9/06* (2013.01); *B60D 1/075* (2013.01); *B60D 1/58* (2013.01); *B60R 9/10* (2013.01)

(58) Field of Classification Search
CPC .......... B60D 1/075; B60D 1/58; B60R 11/00; B60R 9/06; B60R 2011/0049; B60R 2011/0061; B60R 9/10
USPC ........................................................ 224/519
See application file for complete search history.

(56) References Cited

U.S. PATENT DOCUMENTS

| | | | | |
|---|---|---|---|---|
| 4,046,398 A | * | 9/1977 | Dunwoody | B60D 1/46 224/519 |
| 4,050,714 A | * | 9/1977 | Epp | B60D 1/06 280/495 |
| 4,301,953 A | * | 11/1981 | Abbott | B60R 9/06 224/519 |
| 4,380,344 A | * | 4/1983 | Abbott | B60R 9/06 224/519 |
| 4,856,686 A | * | 8/1989 | Workentine | B60R 9/06 224/497 |
| 5,593,172 A | * | 1/1997 | Breslin | B60D 1/155 280/491.5 |
| 5,884,930 A | * | 3/1999 | Cluth | B60D 1/07 224/519 |
| 6,010,144 A | * | 1/2000 | Breslin | B60D 1/155 280/491.5 |
| 6,089,431 A | * | 7/2000 | Heyworth | B60D 1/075 224/521 |
| 6,179,311 B1 | * | 1/2001 | Larkin | B62D 25/188 280/154 |
| 6,186,531 B1 | * | 2/2001 | Parent | B60D 1/52 224/519 |
| 6,511,088 B2 | * | 1/2003 | Kahlstorf | B60D 1/075 224/521 |

(Continued)

*Primary Examiner* — Justin M Larson
(74) *Attorney, Agent, or Firm* — Richard A. Ryan

(57) ABSTRACT

An adapter for use with a tow hitch assembly attached to a vehicle so the adapter may support a useful apparatus which can be utilized with the vehicle and/or be utilized to carry bicycles or other items without compromising the ability to tow a towable vehicle. The adapter comprises an adapter collar having a collar opening sized and configured to be received on and engage either a hitch shaft or a receiver collar of the tow hitch assembly. A pair of arms extend forwardly toward the vehicle from the adapter collar. Each arm has an aperture that aligns with apertures on the hitch shaft and receiver so a locking device may be received through the aligned apertures to secure the adapter to the tow hitch assembly. The useful apparatus attaches to or is integral with outer sides of the adapter collar and/or one or more of the arms.

21 Claims, 11 Drawing Sheets

(56) References Cited

U.S. PATENT DOCUMENTS

| | | | |
|---|---|---|---|
| 6,874,804 B2* | 4/2005 | Reese | B60D 1/06 224/520 |
| 6,915,999 B2* | 7/2005 | Wang | B60R 9/06 248/534 |
| 7,533,789 B1* | 5/2009 | Seely | B60R 9/06 224/282 |
| 7,621,554 B1* | 11/2009 | Cremer | B60D 1/66 280/476.1 |
| 7,784,813 B2 | 8/2010 | Columbia | |
| D652,775 S * | 1/2012 | Spera | D12/203 |
| 8,640,936 B2* | 2/2014 | Ort | B60R 11/00 224/519 |
| 9,333,822 B1* | 5/2016 | LaFave | B60R 9/10 |
| 9,707,811 B2* | 7/2017 | Columbia | B60D 1/07 |
| 9,745,006 B2* | 8/2017 | Pemberton | B60R 9/06 |
| 9,758,003 B2* | 9/2017 | Vernersson | B60D 1/145 |
| 10,220,661 B1* | 3/2019 | Gebheim | B60D 1/363 |
| 2002/0008364 A1* | 1/2002 | Kahlstorf | B60D 1/075 280/515 |
| 2007/0262108 A1* | 11/2007 | Columbia | B60R 9/06 224/519 |
| 2010/0200822 A1* | 8/2010 | Kitchens, Sr. | B66C 23/44 254/326 |
| 2010/0294819 A1* | 11/2010 | Spera | B60R 9/06 224/519 |
| 2016/0031377 A1* | 2/2016 | Pemberton | B60R 9/06 224/519 |

* cited by examiner

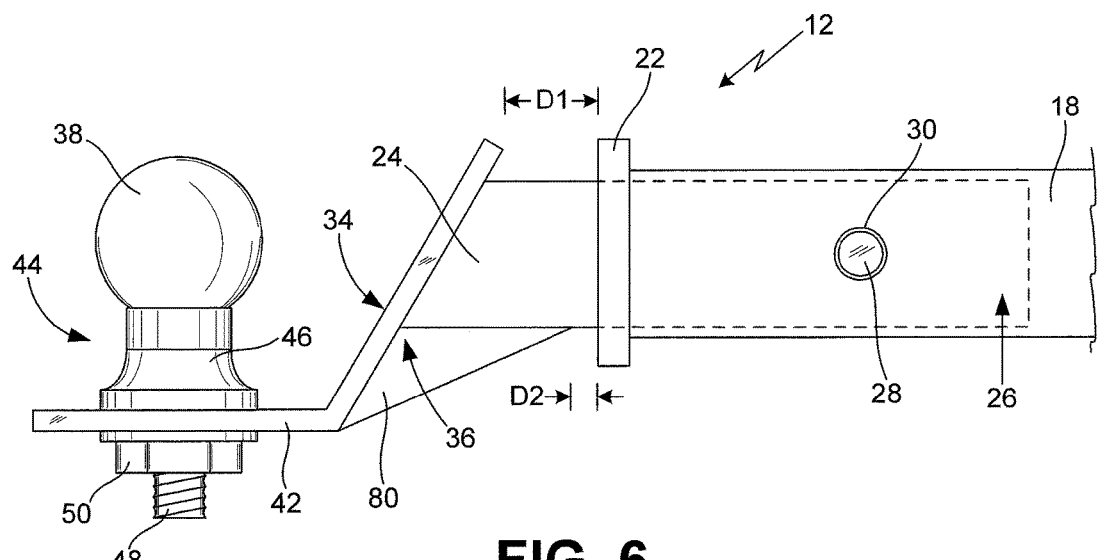
FIG. 6
(PRIOR ART)
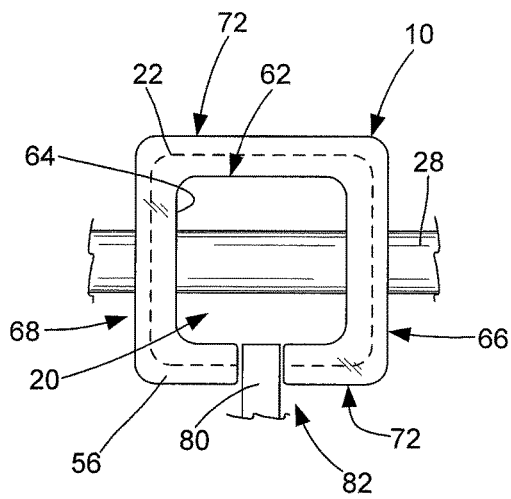 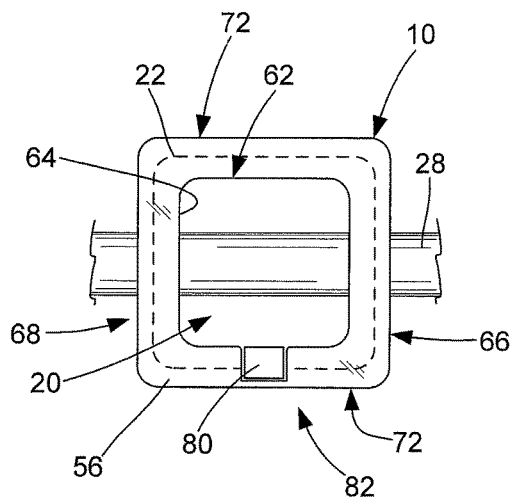
FIG. 7  FIG. 8

ADAPTER FOR SUPPORTING AN APPARATUS ON A VEHICLE TOW HIGH ASSEMBLY

CROSS-REFERENCE TO RELATED APPLICATIONS

None.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The field of the present invention relates generally to devices for supporting a useful apparatus on a tow hitch assembly attached to a vehicle. In particular, the present invention relates to such devices that are removably mounted to the tow hitch assembly so a useful apparatus may be supportedly carried by the vehicle. Even more particularly, this invention relates to such tow hitch devices that are configured to support a wide variety of different types of apparatuses which are utilized for a variety of different carrying and support purposes without interfering with the normal use of the tow hitch assembly.

B. Background

As generally well known, many people utilize a vehicle to transport a wide variety of items from one place to another. Although some of these items may be carried inside the vehicle, many items that are desired to be transported with a vehicle, such as bicycles, skis, ladders, cargo boxes, large tool boxes and the like, do not fit and/or are not easily placed within the relatively small interior space of the vehicle. Even if an item can fit inside the passenger area of the vehicle, placement of a larger-sized item in the vehicle is likely to result in limited space being remaining available for passengers to be in the vehicle. For some items, such as extra gasoline, fuel for camping stoves, open cans of paint or thinner and the like, it is generally not safe or otherwise desirable to carry the smelly and/or potentially explosive material inside the passenger area of the vehicle. In addition, placement of some items inside the vehicle, such as large tool or cargo boxes, substantially reduces the user being able to conveniently access the item to retrieve tools or other components therefrom.

Some vehicles have a roof rack that allows the user to place items, even relatively large items, on the roof of the vehicle or they have an integral trunk or bed area which allows larger items to be carried by the vehicle. Although the roof, trunk and bed areas of the vehicle generally allow transport of larger items than the interior space of the vehicle, they have certain drawbacks that limit the functionality of these areas for carrying certain items, such as large tool boxes, lawnmowers, mobility carts and the like. For instance, placement of items on the roof of the vehicle can be very difficult or even impractical for items that are heavy and/or awkwardly shaped. If not handled properly, such items can be dangerous for the person(s) placing the item on the roof or removing the item from the roof. In addition, an item placed on the roof of a vehicle is subject to greater wind force as the vehicle moves along the road, generally requiring the item to be somewhat more secured than if carried elsewhere on the vehicle. In addition, placement of an item, particularly larger items, on the roof of the vehicle will reduce the gas mileage efficiency of the vehicle. Items carried in the trunk are generally more secure, but most trunks are somewhat limited in size and/or have trunk openings that are configured such that it is not easy to place larger items in the trunk. For instance, skis, bicycles, ladders and the like generally do not fit well within the trunk of a vehicle. The bed of a vehicle, such as a pickup truck, does generally provide more carrying space and generally easier access to that space. However, any item placed in the bed of a vehicle must be very well secured to prevent the item from sliding about the bed, which could damage the item and/or the vehicle. In addition, an item placed in the forward area of the bed of a truck is generally difficult to reach for convenient access to the item. An item placed in the rear area of the bed allows more convenient access, but the item will tend to block access to the remaining portion of the bed.

Many vehicles are equipped with a tow hitch assembly, which is also referred to as a trailer hitch assembly, that is mounted to the vehicle at or near the center rear of the vehicle generally on the lower portion of the vehicle. As well known in the art, a common tow hitch assembly comprises a tube-shaped receiver that is fixedly mounted to the vehicle with a tube opening facing rearward of the vehicle, a receiver collar around the rearwardly facing opening, a hitch shaft having a first or forward end that is received in the receiver through the opening at the receiver collar, a pin or bolt that is received through apertures in the receiver and hitch shaft to connect the receiver to the hitch shaft, a hitch ball mounting plate at the second or rearward end of the hitch shaft and a hitch ball mounted to the mounting plate. The rearward facing tube opening is sized and configured, such as having a square configuration with 2½" sides (which is a common configuration for Class "C" hitches), to removably receive the hitch shaft into the receiver when the user needs to utilize the tow hitch assembly to tow a towable vehicle, such as a cargo trailer, recreational trailer, camper trailer, boat trailer and the like. The hitch ball is sized and configured, typically having a round shape with a 2" to 2½" diameter, to removably connect the tow hitch to a towable vehicle. Typically, a safety chain is utilized as a back-up to interconnect the vehicle tow hitch to the towable vehicle while the towable vehicle is being towed. Although the above describes a common type of tow hitch assembly, those skilled in the art will readily appreciate that there are a variety of different configurations of tow hitch assemblies that are currently in use.

To assist the owner or operator of a vehicle with carrying some of the items described above, including bicycles, tool boxes, mobility carts and extra fuel, a number of rack or platform devices are available that releasably connect to the receiver portion of the tow hitch assembly so as to be supported thereby and transported by the vehicle. Typically, such racks, platforms or the like have a shaft member that is sized and configured to be removably received inside the receiver and secured thereto with the locking pin or bolt that is normally used to secure the hitch shaft. The rack or platform is integral with or attaches to this shaft member so as to be supportedly carried by the receiver. Examples of such rack systems that are utilized to carry one or more bicycles are sold by Thule, Yakima and Saris. Bicycle and other presently available receiver rack systems are generally useful for carrying a variety of items, depending on the item and the configuration of the rack system, and do solve some of the problems described above with regard to carrying certain items. However, utilizing the hitch receiver to receive a shaft member of the rack or platform to secure the rack to the vehicle has the significant disadvantage of eliminating the ability to also use the tow hitch assembly for its intended purpose, namely to tow a towable vehicle therewith. As well known, many people desire to be able to carry items on a rack at the back of the vehicle and to utilize the tow hitch assembly to tow a towable vehicle. A few available rack systems do provide a secondary receiver associated with the rack that faces rearward from the rack which allows the user to tow a towable vehicle. There are also receiver extensions that are utilized to provide a secondary receiver. Unfortunately, these secondary receivers have a smaller diameter and use of the extension leads to a longer lever arm, both of which reduce the tongue capacity available for towing a towable vehicle.

What is needed, therefore, is an improved device for supporting a useful apparatus, such as a rack, platform or the like, on a vehicle tow hitch assembly in a manner that does not diminish or prevent use of the tow hitch assembly to tow a towable vehicle. Such a device should allow the vehicle to transport items that are carried on the apparatus and tow a towable vehicle with the tow hitch assembly. Preferably, such a device should be configured to support the apparatus so the item or items being carried thereby will not interfere with the normal use of the tow hitch assembly, namely towing a towable vehicle, and without reducing the towing capacity of the tow hitch assembly. The preferred device should be configured to supportedly carry a wide variety of useful apparatuses that are each configured to support one or more different types of items and/or to perform a function that is useful for the user.

SUMMARY OF THE INVENTION

The adapter for supporting an apparatus on a vehicle tow hitch assembly of the present invention provides the benefits and solves the problems identified above. That is to say, the present invention discloses an adapter that attaches to a vehicle tow hitch assembly and which is utilized to support a useful apparatus on the tow hitch assembly so that the useful apparatus and, if desired, one or more items can be transported with the vehicle. The adapter of the present invention is configured to support the useful apparatus, such as a rack, gate, platform or the like, on a vehicle tow hitch assembly in a manner that does not interfere with the use of the tow hitch assembly to tow a towable vehicle, such as a trailer or the like. The adapter allows use of the tow hitch assembly to carry a useful apparatus, including racks for transporting bikes, spare tires, gas cans and tool boxes, devices which are beneficially utilized with the vehicle, such as pivoting gate assemblies and the like, and devices which support items that can be used at the vehicle destination, such as ladders, tables and the like. The adapter of the present invention can be configured to supportedly carry a wide variety of useful apparatuses that are can be beneficially utilized with the vehicle or be configured to support one or more items without diminishing or preventing use of the tow hitch assembly to tow a towable vehicle.

In a primary embodiment of the present invention, the adapter generally comprises an adapter collar, a pair of arms attached to or integral with the adapter collar and a locking device that is utilized to secure the adapter to a tow hitch assembly having a hitch shaft removably received in a receiver attached to a vehicle. The adapter collar has a collar opening disposed through the adapter collar and one or more outer sides facing outward from the adapter collar. The collar opening, which is typically centered in the adapter collar, is defined by one or more interior sidewalls that are sized and configured so the adapter collar can be received on and tightly engage the tow hitch assembly without interfering with the ability of the hitch shaft to be removably received in the receiver. The pair of arms, which are disposed in spaced apart relation to each other, are positioned on the adapter collar so as to extend generally parallel to the receiver and hitch shaft when the adapter is received on the tow hitch assembly. Each of the pair of arms has a proximal end located at the adapter collar and a distal end that extends forwardly from the adapter collar. Each of the pair of arms also has an arm aperture that is disposed generally toward the distal end thereof. The arm apertures are positioned on the arms so they are aligned in corresponding relation to a pair of receiver apertures that are located on the receiver and to a pair of hitch apertures that are located on the hitch shaft when the adapter is received on the tow hitch assembly. The locking device is sized and configured to be received through each of the arm apertures of the pair of arms and through each of the receiver apertures and the hitch apertures of the tow hitch assembly. A locking mechanism, such as a pin or the like, locks the locking device in place to prevent unintentional separation of the adapter from the tow hitch assembly. The useful apparatus is attached to or integral with at least one, typically a plurality, of the outer sides of the adapter collar and/or the arms. With the adapter and its useful apparatus attached to the tow hitch assembly, the vehicle may be utilized to transport the useful apparatus and any items attached to or carried by the useful apparatus.

In one embodiment, the interior sidewalls of the collar opening are dimensioned in corresponding relation to the hitch shaft so as to tightly fit on and engage the hitch shaft. In another embodiment, the interior sidewalls of the collar opening are dimensioned in corresponding relation to a receiver collar, which is typically located at or near the tube opening of the receiver, so as to tightly fit on and engage the receiver collar. In either embodiment, each of the pair of arms are sufficiently spaced apart on the adapter collar to extend over and past the receiver collar. In yet another alternative embodiment, the bottom side of the adapter collar has a gap, which may be defined by a slot, that is sized and configured to receive and engage a gusset that is located at or near a second end of the hitch shaft to allow use of the adapter with such hitch shafts. The adapter can include a bottom extension member extending generally forward from the adapter collar over the receiver that has an engaging mechanism associated therewith for engaging the receiver so as to level the adapter and/or lock the adapter to the hitch assembly. The engaging mechanism can comprise one or more engaging devices, such as a set screw, that extends through the bottom extension member and to engage a bottom surface of the receiver. The useful apparatus can be a bicycle rack having a first frame member that extends generally upward from the adapter to connect with other bicycle frame members to support one or more bicycles thereon. Alternatively, the useful apparatus can be a carrier apparatus that is configured to carry one or more items thereon. In a preferred embodiment, the carrier apparatus comprises a pair of elongated primary support arms that extend outwardly in opposite directions from the adapter, a carrier arm extending outwardly from each of the primary support arms and a vertical section extending upward from a distal end of each of the carrier arms. Preferably, each carrier arm is telescopically connected to its respective primary support arm to allow the user to adjust the width of the carrier apparatus to correspond with the width of the vehicle. In one embodiment, the item carried by the carrier apparatus is a gate assembly that is pivotally attached to an upper end of one of or each of the vertical sections. If desired, the gate assembly can be configured to support one or more secondary items thereon, such as a tire mount, a storage bin, a bicycle rack and/or a tool box. Various other useful apparatuses can attach to the adapter of the present invention and many different types of items can be carried by the useful apparatus to allow transport by the vehicle.

Accordingly, the primary aspect of the present invention is to provide an adapter for supporting a useful apparatus on a vehicle tow hitch that has the advantages discussed above and which overcomes the various disadvantages and limitations associated with prior art tow hitch devices for carrying such useful apparatuses.

It is an important aspect of the present invention to provide an adapter for a vehicle tow hitch assembly that allows use of the tow hitch assembly to carry various useful apparatuses without interfering with the normal use of the tow hitch assembly to tow a towable vehicle, such as a trailer or the like.

It is an important aspect of the present invention to provide an adapter for supporting a useful apparatus on a vehicle tow hitch assembly that is configured to securely fit on and be carried by the tow hitch assembly so the useful apparatus can be transported by the vehicle and/or utilized with the vehicle to provide a useful function for the vehicle, such as providing a gate enclosure and/or being able to carry other items.

It is also an important aspect of the present invention to provide an adapter for supporting a useful apparatus on a vehicle tow hitch assembly that comprises an adapter collar and a pair of arms extending forwardly therefrom, with the collar having a collar opening sized and configured to be received on and engage either the hitch shaft or the receiver collar of the tow hitch assembly and the arms being connected to the receiver of the tow hitch assembly. The useful apparatus is attached to or integral with outer sides of the adapter collar and/or the arms.

It is also an important aspect of the present invention to provide an adapter for supporting a useful apparatus on a vehicle tow hitch assembly which generally comprises an adapter collar that fits on the hitch shaft or receiver, a pair of arms attached to or integral with the adapter collar which extend forwardly from the adapter collar and a locking device that is received through apertures in the arms, receiver and hitch shaft to secure the adapter to the tow hitch assembly when the hitch shaft is removably received in the receiver.

Another important aspect of the present invention is to provide an adapter for supporting a useful apparatus on a vehicle tow hitch assembly that is configured to attach to or be integral with a wide variety of different types of useful apparatuses.

Yet another important aspect of the present invention is to provide an adapter for supporting a useful apparatus on a vehicle tow hitch assembly having a hitch shaft removably received in a receiver that is adaptable for different sizes and configurations of such tow hitch assemblies.

The above and other aspects and advantages of the present invention are explained in greater detail by reference to the attached figures and the description of the preferred embodiment which follows. As set forth herein, the present invention resides in the novel features of form, construction, mode of operation and combination of the above presently described and understood by the claims.

BRIEF DESCRIPTION OF THE DRAWINGS

In the drawings which illustrate the preferred embodiments and the best modes presently contemplated for carrying out the present invention:

FIG. 6 is a right side view of a prior art hitch assembly having a reinforcement gusset on the lower side of the hitch shaft;

FIG. 7 is a back view of an alternative configuration of adapter for supporting an apparatus on a vehicle tow hitch assembly for use with the tow hitch assembly of FIG. 6;

FIG. 8 is a back view of another alternative configuration of adapter for supporting an apparatus on a vehicle tow hitch assembly for use with the tow hitch assembly of FIG. 6;

DETAILED DESCRIPTION OF THE PREFERRED EMBODIMENTS

Figure 1:
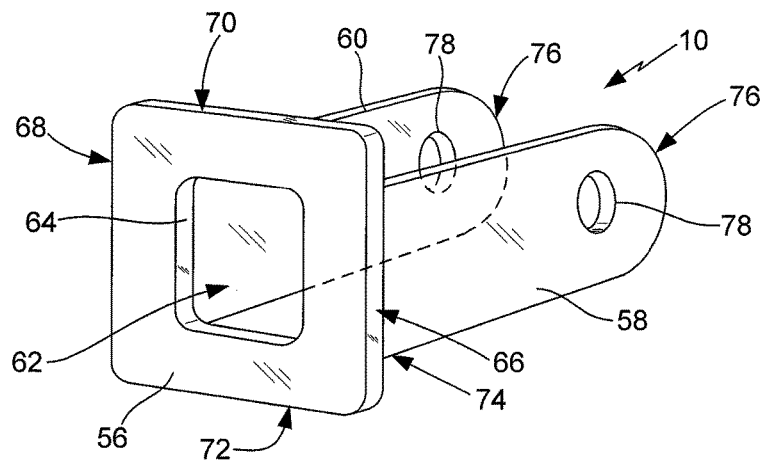
FIG. 1 is a right side perspective view of an adapter for supporting an apparatus on a vehicle tow hitch assembly configured according to a preferred embodiment of the present invention.

With reference to the figures where like elements have been given like numerical designations to facilitate the reader's understanding of the present invention, the preferred embodiments of the present invention are set forth below. The enclosed text and drawings are merely illustrative of one or more preferred embodiments and, as such, disclose one or more different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein show certain types of useful apparatuses and items carried by or attached to the apparatuses, those skilled in the art will understand that this is merely for purposes of simplifying this disclosure and that the present invention is not so limited.

An adapter that is configured pursuant to various embodiments of the present invention is shown generally as 10 in FIGS. 1-5, 7-16 and 21-22. The adapter 10 is configured for use with a tow hitch assembly 12 that is attached to or otherwise associated with a vehicle 14, as best shown in FIGS. 2, 3, 5, 10 and 16. In normal use, tow hitch assembly 12 is configured to allow the user to tow a towable vehicle 16, such as the trailer shown in FIG. 5, behind the vehicle 14. The typical tow hitch assembly 12 is mounted to the vehicle 14 at or near the center rear of the vehicle 14 generally on the lower portion thereof. As well known, a common tow hitch assembly 12 comprises a tube-shaped receiver 18 that is fixedly mounted to the vehicle 14 with a tube opening 20 facing rearward of the vehicle 14, a receiver collar 22 disposed around the rearwardly facing tube opening 20, a hitch shaft 24 having a first or forward end 26 that is slidably received in the receiver 18 through the tube opening 20 at the receiver collar 22, a locking device 28 (typically configured as a pin, bolt or the like) that is received through a pair of opposing receiver apertures 30 in the receiver 18 and a pair of opposing hitch apertures 32 in the hitch shaft 24 to connect receiver 18 to hitch shaft 24, a hitch ball mounting plate 34 at the second or rearward end 36 of the hitch shaft 24 and a hitch ball 38 mounted to the hitch ball mounting plate 34, as best shown in FIGS. 2, 3, 5, 6 and 10. The rearward facing tube opening 20 and hitch shaft 24 are cooperatively sized and configured so the hitch shaft 24 can be removably received in the receiver 18 when the user desires to utilize tow hitch assembly 12 to tow a towable vehicle 16, which can be a recreational trailer, cargo trailer, camper trailer, boat trailer or the like. The standard hitch ball 38 is sized and configured, typically having a round shape with a 2" to 2½" diameter, to removably engage a tow tongue 40 that connects the tow hitch 12 to a towable vehicle 16, as best shown in FIG. 5. Typically, the hitch ball 38 attaches to a generally horizontal portion 42 of the hitch ball mounting plate 34 utilizing a ball attachment assembly 44 comprising a base 46 having a threaded bolt 48 and nut 50 connecting element. A safety chain (not shown in the figures) is often utilized as a secondary or back-up safety device while the towable vehicle 16 is being towed by vehicle 14. Although the above describes a commonly configured tow hitch assembly 12, those skilled in the art will readily appreciate that a variety of different configurations of tow hitch assemblies are currently in use. As with the tow hitch assembly 12 described above, these other tow hitch assemblies are also generally suitable for use with adapter 10 of the present invention.

The adapter 10 of the present invention is configured to engage one or more components of tow hitch assembly 12 to support a useful apparatus 52 that can be utilized on its own with vehicle 14 and/or be utilized to carry one or more items 54 thereon. Examples of useful apparatuses 52 and items 54 are set forth below and shown in FIGS. 5 and 16 through 20. The useful apparatuses 52 and items 54 described below and shown in the referenced figures are included herein for exemplary purposes only. As will be readily appreciated by those skilled in the art, adapter 10 can be utilized with a wide variety of useful apparatuses 52 and items 54 and, as such, the various examples included herein are not intended to limit the scope of the present invention.

One embodiment of the adapter 10 of the present invention is shown in FIGS. 1 through 5. In this embodiment, the adapter 10 comprises an adapter collar 56 and a pair of forwardly extending arms, namely first arm 58 and second arm 60, that are attached to or integral with the adapter collar 56. For purposes of the present disclosure, the terms forward direction, forwardly or front refers to the direction towards the front of the vehicle 14 and the terms rearward direction, rearwardly or back refers to the direction towards the rear of the vehicle 14. As explained in more detail below, the adapter collar 56 and/or forwardly extending arms 58/60 attach to or are integral with useful apparatus 52 so that the useful apparatus 52 may be supportedly carried by the tow hitch assembly 12 so that the useful apparatus 52 may be utilized with the vehicle 14 or one or more items 54 may be carried by the vehicle 14 at tow hitch assembly 12.

Figure 2:
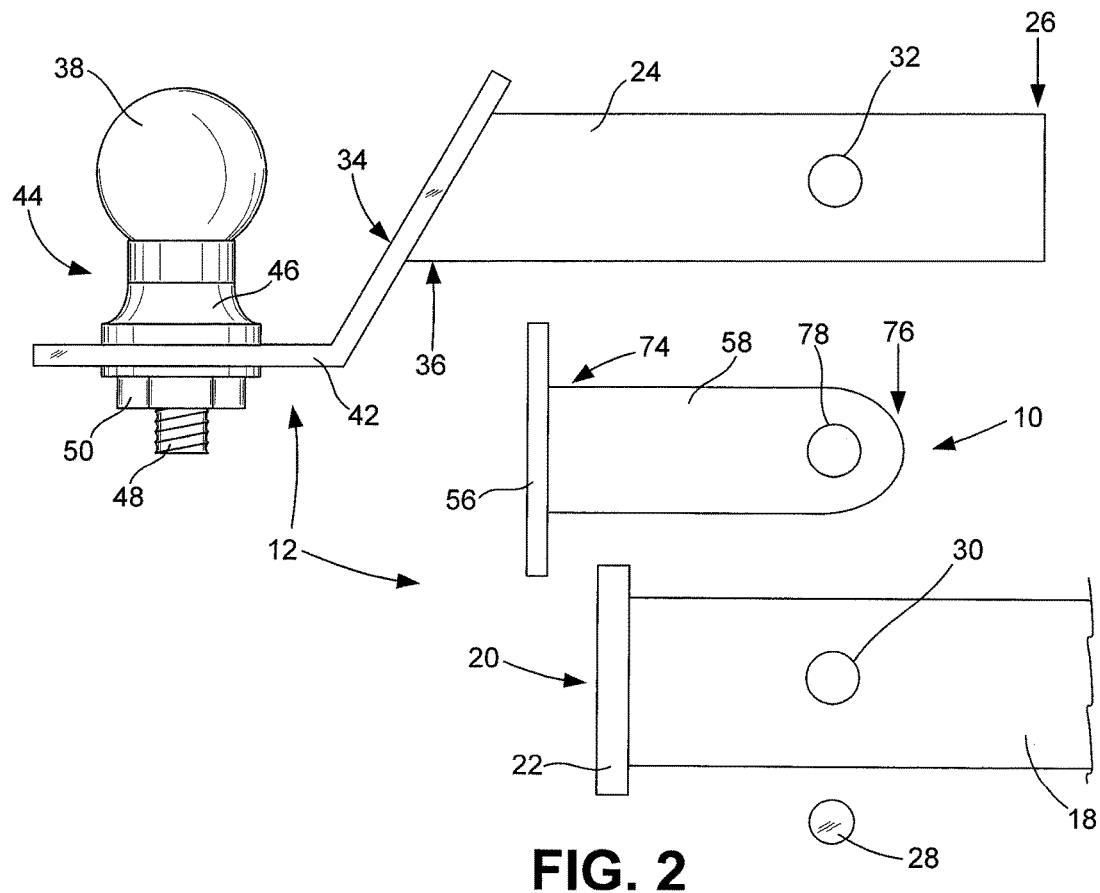
FIG. 2 is an exploded right side view of the adapter of FIG. 1 shown with a tow hitch assembly.
Figure 3:
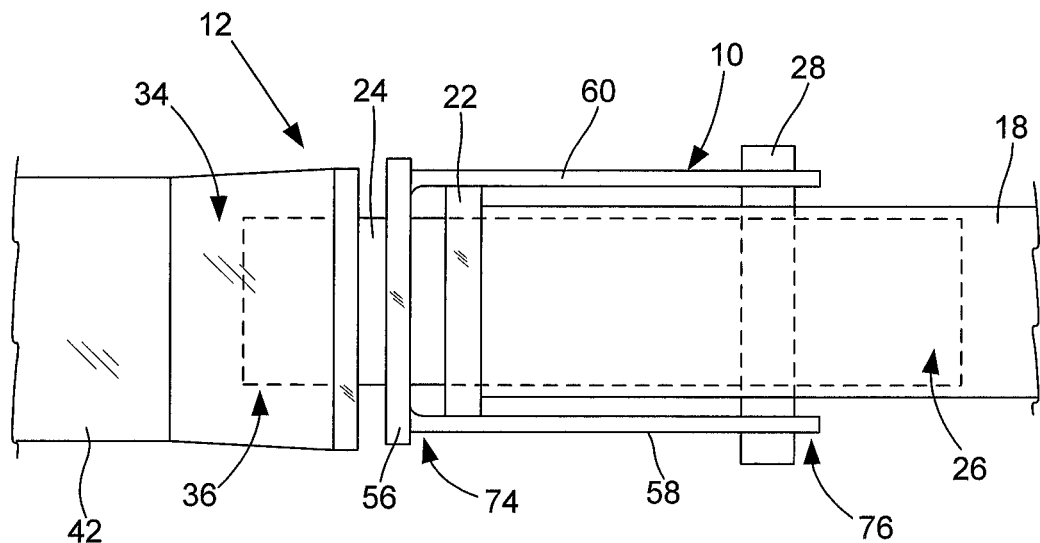
FIG. 3 is a top view of the adapter and tow hitch assembly of FIG. 2 shown without the hitch ball.
Figure 4:
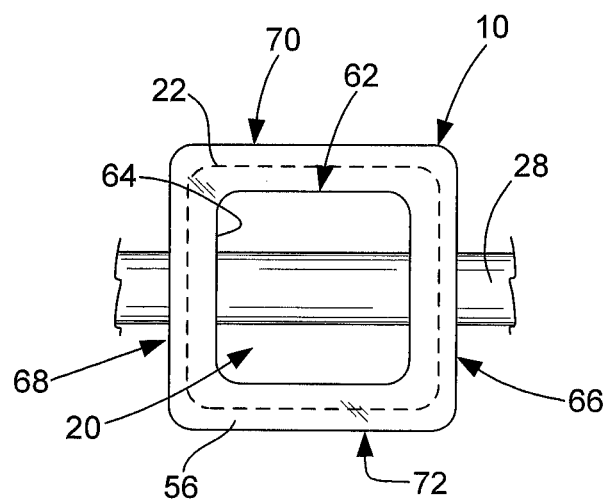
FIG. 4 is a back view of the adapter and tow hitch assembly of FIG. 2 shown without the hitch shaft and hitch ball mount.
Figure 5:
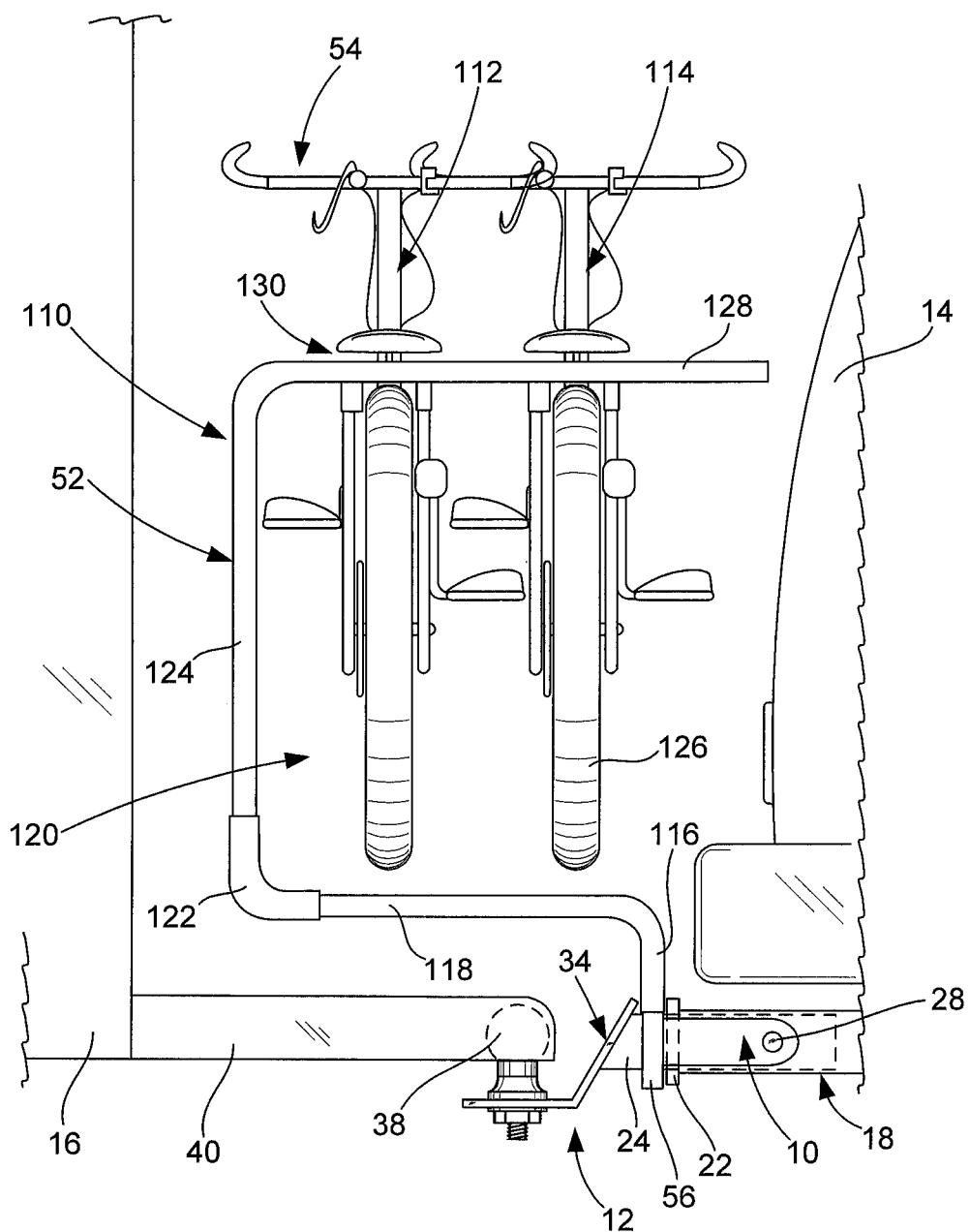
FIG. 5 is a right side view of the adapter and tow hitch assembly of FIG. 2 shown in use with an apparatus configured as a bicycle rack supporting two bicycles thereon.

Adapter collar 56 has a collar opening 62 with interior sidewalls 64 that are sized and configured to be in substantially corresponding relation to the outer dimensions of hitch shaft 24 and the collar opening 62 is positioned so as to be generally aligned with the tube opening 20 of receiver 18 when adapter 10 is in use with tow hitch assembly 12, as best shown in FIGS. 1 through 4. Collar opening 62 is sized and configured to fit tightly or snugly over the hitch shaft 24, preferably with very little or no wobbling when adapter 10 is received onto hitch shaft 24. In the embodiment shown in the figures, collar opening 62 has a square shape that has dimensions which are substantially the same as the square shape of hitch shaft 24 (only very slightly larger so adapter collar 56 fits over the hitch shaft 24). Adapter collar 56 has a plurality of outer sides that attach to or are integral with useful apparatus 52 so as to support the useful apparatus 52 on the tow hitch assembly 12. In the embodiment shown in the figures, adapter collar 56 has a first side 66, a second side 68 on the opposite side of the adapter collar 56, a top side 70 and a bottom side 72 on the opposite side of the adapter collar 56, as best shown in FIGS. 1 and 4. In one embodiment, the useful apparatus 52 will attach to or be integral with one or more of the outer sides 66, 68, 70 and 72 to be supported on the tow hitch assembly 12. Alternatively, the useful apparatus 52 will attach to or be integral with one or more of the forwardly extending arms 58/60 or to both the adapter collar 56 and one or more arms 58/60. Often, at least two of the outer sides 66, 68, 70 and 72 and/or both arms 58/60 will attach to or be integral with useful apparatus 52 so as to provide sufficient connection between the adapter 10 and useful apparatus 52 to safely and effectively support the useful apparatus 52 on tow hitch assembly 12 associated with vehicle 14. Each of first arm 58 and second arm 60 has a first or proximal end 74 that is attached to or integral with the adapter collar 56, a second or distal end 76 that extends forwardly from and is in spaced relation to the adapter collar 56 and an arm aperture 78 generally positioned towards the second end 76 of arms 58/60, as best shown in FIGS. 1 and 2. As shown in the figures, the first arm 58 and second arm 60 extend generally parallel to the receiver 18 and the hitch shaft 24 when adapter 10 is positioned on hitch assembly 12. The arms 58/60 have a length from first end 74 to second end 76 that is sufficient for the second end 76 to extend past the receiver apertures 30 of receiver 18 so the arm apertures 78 may be aligned with the receiver apertures 30 and hitch apertures 32 to allow the locking device 28 to be received through each of the arm 78, receiver 30 and hitch 32 apertures to interlock these components together to essentially form a single or unified unit. Typically, a locking mechanism, such a cotter pin or other connector, goes through one or both ends of the locking device 28 to prevent the locking device 28 from falling out during movement of vehicle 14. As best shown in FIG. 2, when positioned for use on tow hitch assembly 12, the arm apertures 78, receiver apertures 30 and hitch apertures 32 are aligned in corresponding relation. As with receiver apertures 30 and hitch apertures 32, the arm apertures 78 should be sized and configured to tightly receive locking device 28.

The tube opening 20 of receiver 18 and the outer dimensions of the hitch shaft 24 are provided in standard sizes. The collar opening 62 is sized and configured to fit over and be supported by the standard hitch shaft 24, providing a generally universal adapter 10 for supporting a useful apparatus 52. The tight fit of collar opening 62 onto the hitch shaft 24 provides support in all directions, including rotational resistance. In a preferred embodiment, the standard locking device 28 is replaced with an improved locking device 28 that is made out of a high strength material and having a sufficient length to extend completely through the arms 58/60 of adapter 10, receiver 18 and hitch shaft 24 (the adapter 10 requires a slightly longer length, depending on the thickness of arms 58/60, than the usual locking device). In one embodiment, the locking device 28 is a high strength bolt and nut with which the user can tighten the arms 58/60 against the collar 22 of receiver 18 to provide additional resistance to rotation and bending, as shown in FIG. 3. One benefit of the configuration of adapter 10 of FIGS. 1 through 5 is that there will usually not be any interference with the mounting elements that are utilized to mount receiver 18 to vehicle 14 or from the safety chains that are often utilized when towing the towable vehicle 16. Although shown with certain shapes in the figures, the shape of adapter collar 56 and arms 58/60 can be varied from that shown. Adapter 10 will typically be manufactured from a metal such as steel, aluminum, stainless steel or other suitable alloys. If desired, some composite materials may also provide sufficient strength features to be utilized for adapter 10.

Alternative embodiments of adapter 10 described above are shown in FIGS. 7 and 8. These embodiments are particularly useful for those prior art tow hitch assemblies 12 that have a reinforcing gusset 80 on the lower side of the hitch shaft 24 at or near the second end 36 thereof, as shown in FIG. 6. The configuration of the adapter 10 described above may not be able to fit with the space between the end of the gusset 80 and the collar 22 of receiver 16. In the typical configuration, the space available for placement of the adapter 10 is the distance between the top of the hitch mounting plate 34 and the collar 22, which distance is shown as D1 in FIG. 6. Because of gusset 80, however, the space available for the placement of adapter 10 is shortened to the distance between the forward end of the gusset 80 and the collar 22, which distance is shown as D2 in FIG. 6. To nearly universally fit into the space available and accommodate gusset 80, the adapter collar 56 is provided with a gap 82 through the bottom side 72 thereof that is sized to receive the gusset 80 therein. In FIG. 7, the gap 82 extends all the way through the lower wall of adapter collar 56 (i.e., from the inner sidewall 64 to the bottom side 72 of adapter collar 56). The ends of the adapter 10 at the gap 82 should abut or nearly abut gusset 80 (as shown) to provide the desired stability for adapter 10 to resist bending and rotational forces that result from the weight and movement of the useful apparatus 52 and the one or more items 54 carried thereby. The downward forces on the adapter 10 during use thereof to support a useful apparatus 52 and items 54 should be such as to keep the ends of the adapter 10 at the gap from spreading apart. In FIG. 8, gap 82 is defined by a slot in the lower wall of adapter collar 56. As shown, the gap 82 defined by the slot does not extend all the way through to the bottom side 72 of adapter collar 56. Because the adapter collar 56 is continuous on all four sides, the slotted opening defining gap 82 avoids the possibility that the gap 82 could spread apart and then tend to swing, which may be possible with the gap 82 of FIG. 7, when useful apparatus 52 is supported by adapter 10, particularly if one or more heavy items 54 are supported by useful apparatus 52.

Figure 9:
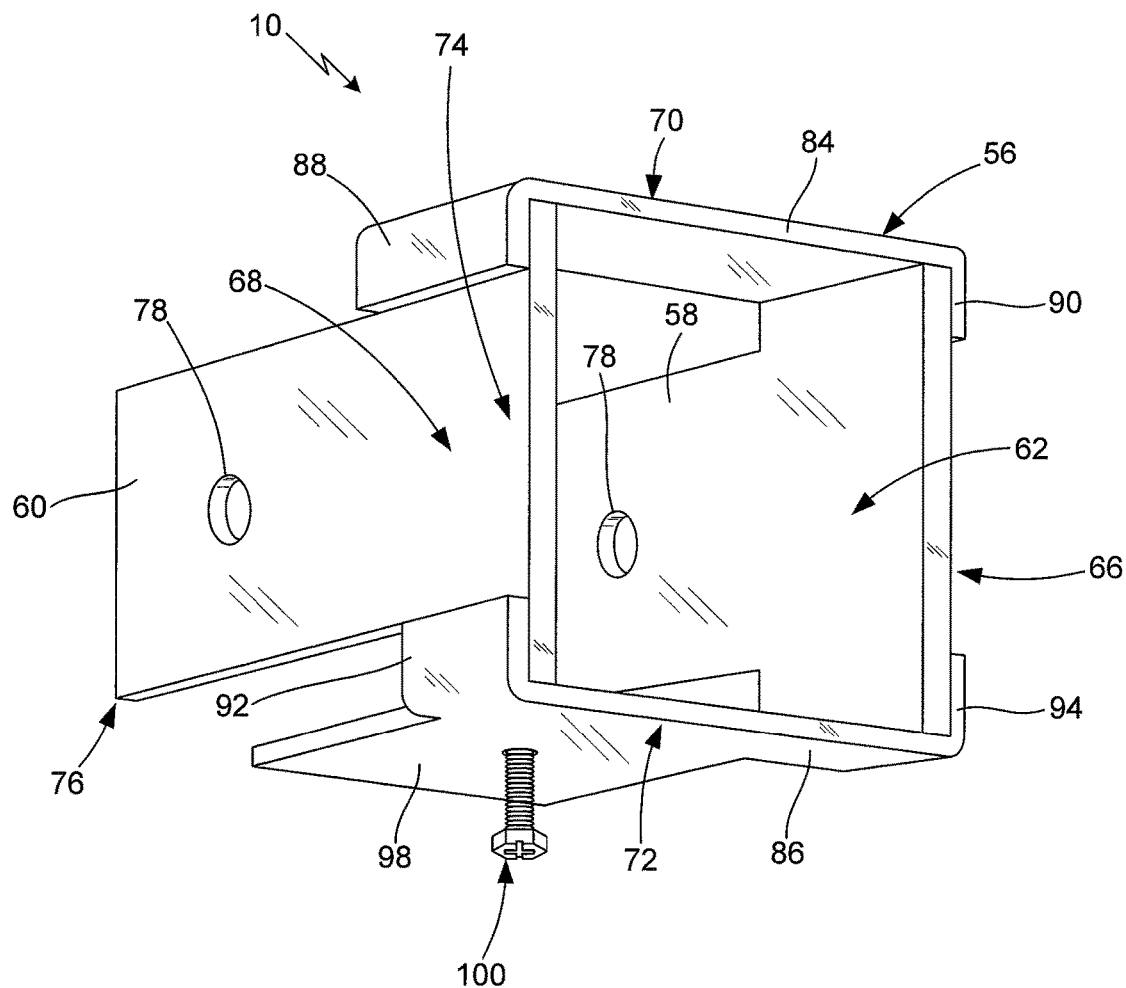
FIG. 9 is a left side perspective view of another alternative configuration of an adapter for supporting an apparatus on a vehicle tow hitch assembly.
Figure 10:
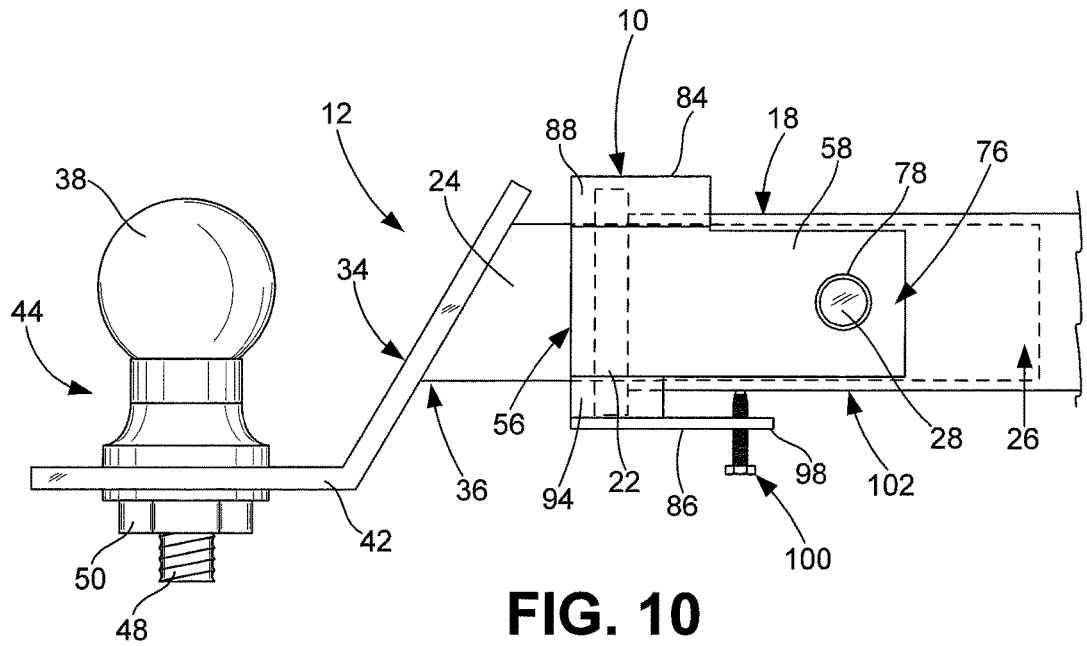
FIG. 10 is a right side view of the adapter of FIG. 9 shown on a tow hitch assembly.
Figure 11:
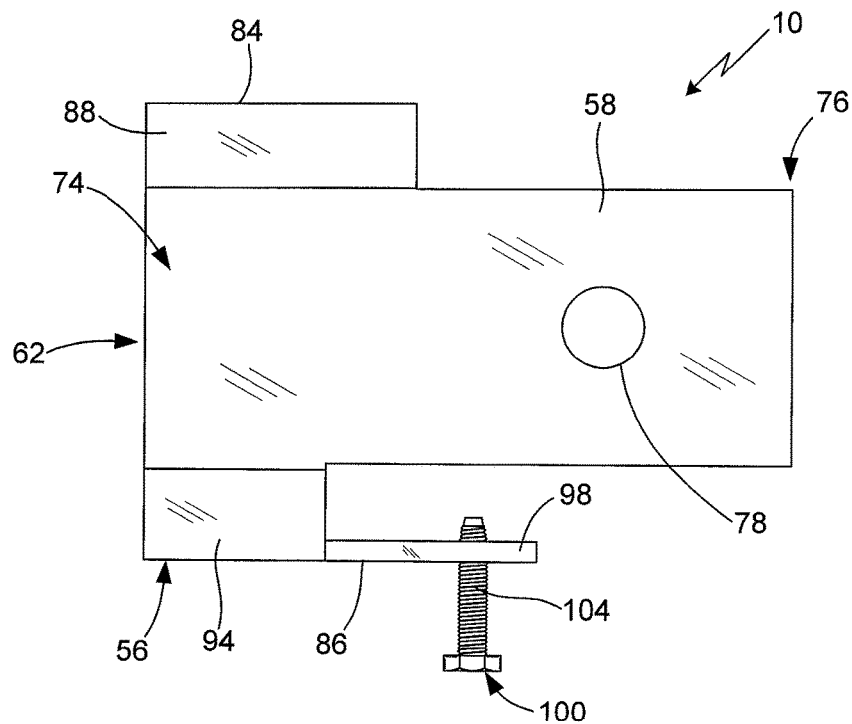
FIG. 11 is a right side view of the adapter of FIG. 9.

Another alternative embodiment of the adapter 10 of the present invention is shown in FIGS. 9 through 15. As with the above embodiments, the adapter 10 of this embodiment is supported by the tow hitch assembly 12 and adaptable for connection (whether by attachment or being integrally formed) with a useful apparatus 52 to be utilized with the vehicle 14 by itself or to enable the vehicle 14 to carry one or more items 54. In this configuration, the adapter collar 56 is sized and configured to be in corresponding relation to the dimensions of collar 22 of the receiver 18, as opposed to the dimensions of the hitch shaft 24 in the above embodiments. As best shown in FIG. 10, the adapter collar 56 of this embodiment is sized and configured to fit tightly or snugly over at least three of the sides of receiver collar 22, preferably with very little or no wobbling when adapter 10 is received onto the receiver collar 22. In the embodiment shown in the figures, collar opening 62 has a square shape that has dimensions which are substantially the same as the square shape of the receiver collar 22 (only very slightly larger so adapter collar 56 fits over the collar 22) such that the receiver collar 22 provides support for the adapter 10. As with the above embodiment, the adapter collar 56 of this embodiment has a pair of forwardly extending arms 58/60 as well as a plurality of outer sides that attach to or are integral with useful apparatus 52 so as to support useful apparatus 52 on the tow hitch assembly 12. In the embodiment shown in the FIGS. 9 through 15, the adapter collar 56 has a generally square shape with a first side 66, a second side 68 on the opposite side of adapter collar 56, a top side 70 and a bottom side 72 on the opposite side of the adapter collar 56. Often, two or more of the outer sides 66, 68, 70 and 72 and/or one or more of the arms 58/60 will attach to or be integral with the useful apparatus 52 so as to provide sufficient connection between the adapter 10 and the useful apparatus 52 to safely and effectively support the useful apparatus 52 on tow hitch assembly 12 associated with vehicle 14. Each of first arm 58 and second arm 60 has a first or proximal end 74 that is attached to or integral with (as shown) the adapter collar 56, a second or distal end 76 that extends forwardly from and is in spaced relation to the adapter collar 56 and an arm aperture 78 generally positioned towards the second end 76 of arms 58/60, as best shown in FIGS. 9 through 11. As shown in the figures, the first arm 58 and second arm 60 extend generally parallel to receiver 18 and hitch shaft 24 when the adapter 10 is positioned on hitch assembly 12. The arms 58/60 have a length from first end 74 to second end 76 that is sufficient for second end 76 to extend past the receiver apertures 30 of receiver 18 so the arm apertures 78 may be aligned with the receiver apertures 30 and hitch apertures 32 and the locking device 28 may be received through each of the arm apertures 78, receiver apertures 30 and hitch apertures 32 to interlock these components together to essentially form a single or unified unit. A locking mechanism, such as a cotter pin or other connector, goes through one or both ends of the locking device 28 to prevent the locking device 28 from falling out during movement of the vehicle 14. When positioned on receiver collar 22 for use, the arm apertures 78, receiver apertures 30 and hitch apertures 32 are at least generally aligned. As with the receiver apertures 30 and hitch apertures 32, arm apertures 78 are sized and configured to tightly receive the locking device 28. As described with the embodiment above, it may be desirable or necessary to replace the standard locking device 28 with a high strength locking device 28 of slightly longer length or with a high strength bolt.

Figure 12:
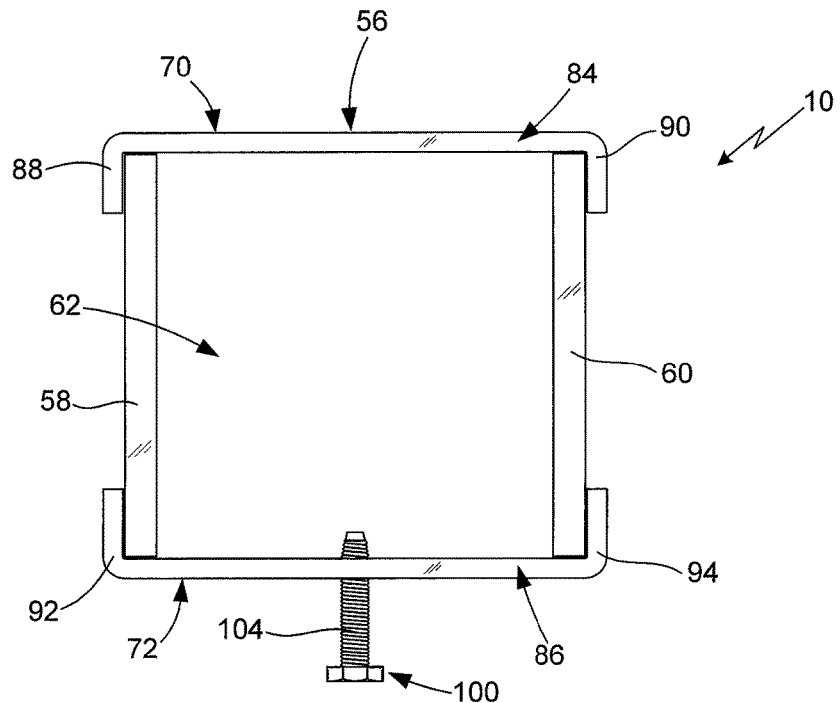
FIG. 12 is a back view of the adapter of FIG. 9.
Figure 13:
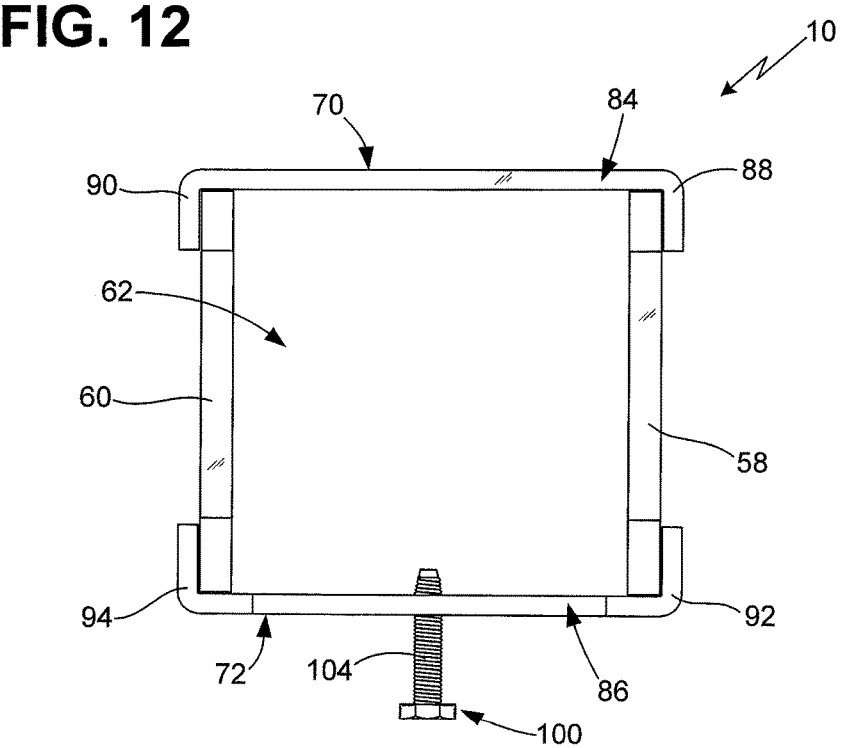
FIG. 13 is a front view of the adapter of FIG. 9.
Figure 14:
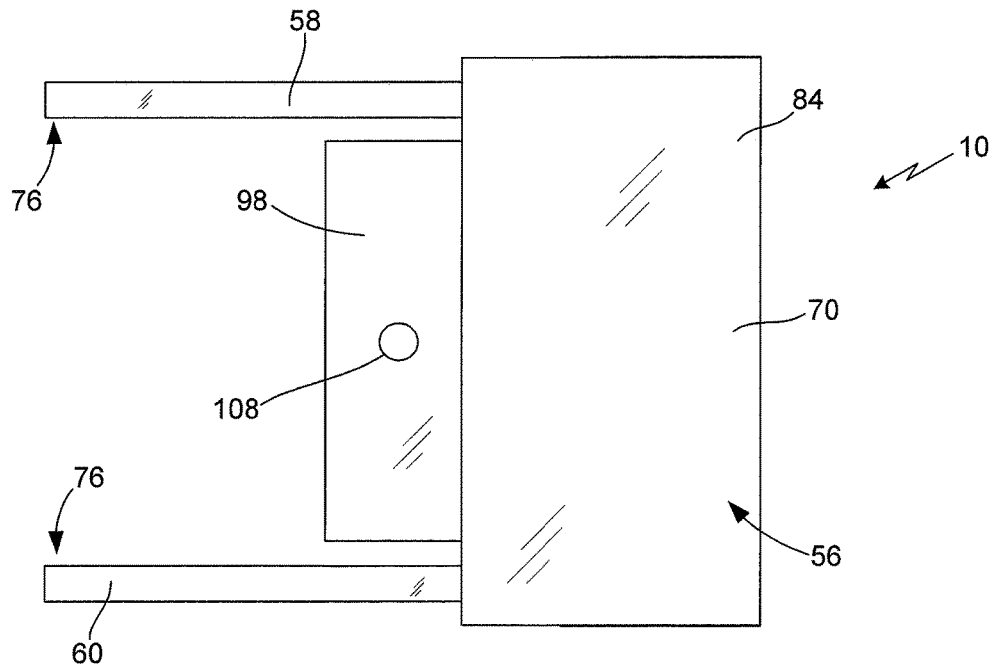
FIG. 14 is a top view of the adapter of FIG. 9 shown without the leveling/locking mechanism.
Figure 15:
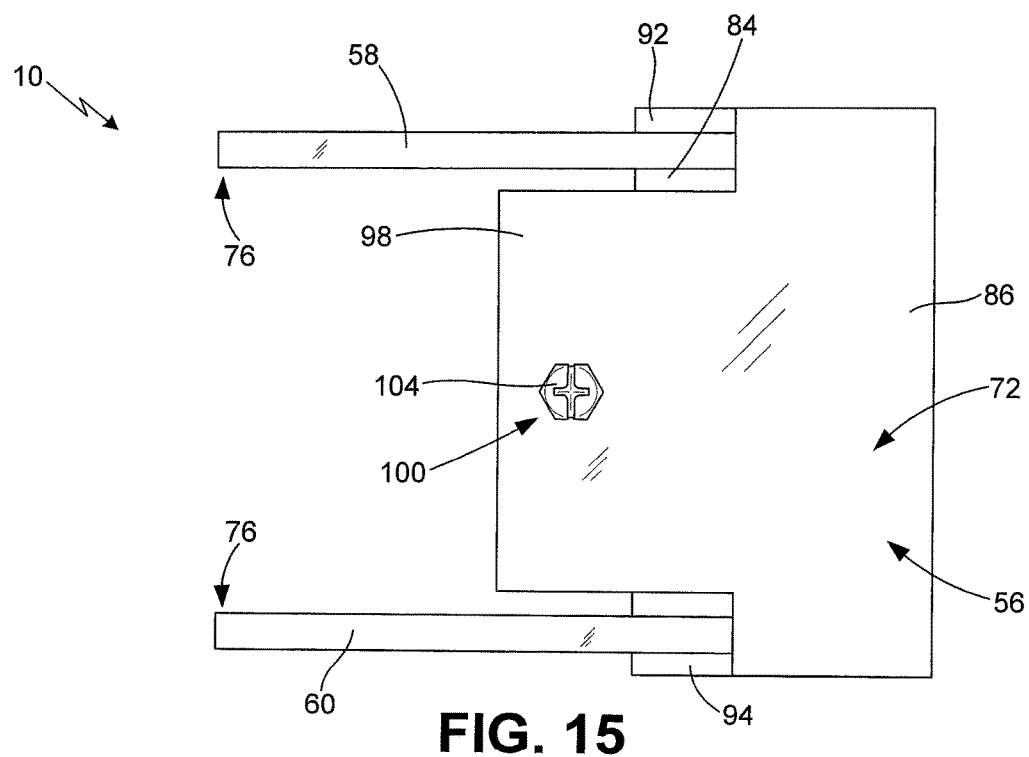
FIG. 15 is a bottom view of the adapter of FIG. 9.

Adapter 10 can be a single integral component or, as shown in FIGS. 9 through 15, the adapter 10 can comprise a plurality of components that are joined together to form adapter 10. In the embodiment shown, the adapter 10 has generally T-shaped arms 58/60 that are turned sideways, an upper section 84 that has an inversed U-shaped portion that engages the upwardly extending portions of arms 58/60 and a lower section 86 that has a U-shaped portion which engages the downwardly extending portions of the arms 58/60, as best shown in FIGS. 9, 12 and 13. Upper section 84 has downwardly extending side members 88 and 90 and lower section 86 has upwardly extending side members 92 and 94. As shown, the downwardly extending side members 88/90 of upper section 84 engage and connect to the upwardly extending portion of arms 58/60 and the upwardly extending side members 92/94 of lower section 86 engage and connect to the downwardly extending portion of arms 58/60. The opening 62 is defined by the inner surfaces of arms 58/60, top side 72 and bottom side 74, as best shown in FIGS. 9 and 12. In a preferred embodiment, these components are welded together or, depending on the material for the adapter 10, joined by adhesives. Alternatively, these components can be joined by one or more connecting mechanisms 96, such as screws, bolts, rivets or the like. As well known in the art, a wide variety of mechanisms 96 can be utilized to connect the side members 88/90 and 92/94 to the arms 58/60. Once connected, the adapter 10 should function as a single integral unit that tightly engages the receiver collar 22 to support a useful apparatus 52 that is attached to or integral with the adapter collar 56 and/or extension arms 58/60 so the useful apparatus 52 can be utilized by the vehicle 14 or one or more items 54 can be carried by the vehicle 14. As with the above embodiment, the adapter 10 of this embodiment will typically be manufactured from a metal such as steel, aluminum, stainless steel or other suitable alloys. If desired, some composite materials may also provide sufficient strength features to be utilized for adapter 10.

The embodiment shown in of FIGS. 9 through 15 also includes a bottom extension member 98 that extends forward from the adapter collar 56 of the adapter 10. As best shown in FIG. 10, bottom extension member 98 extends forward of receiver collar 22 under receiver 18 and can be utilized to support one or more leveling and/or locking engaging mechanisms 100 that are associated with bottom extension member 98 to engage bottom surface the 102 of receiver 18. Engaging mechanisms 100 allow the user to adjust the positioning of adapter 10 on receiver 18 to ensure that the useful apparatus 52 is in the proper position (i.e., upright position or generally vertical) and not leaning and to lock the adapter 10 to the receiver 18. Engaging mechanisms 100 also prevent rattling, which can be annoying to the user of adapter 10 and useful apparatus 52. A variety of different engaging devices can be utilized for engaging mechanism 100, including the set screw 104 shown in FIGS. 11 through 15. In this embodiment, set screw 104 is received through and engages an aperture 108, shown in FIG. 14, located in bottom extension member 98. In use, as shown in FIG. 10, the bottom of the set screw 104 contacts against the bottom surface 102 of receiver 18 to level/lock adapter 10 in place thereon. As well known in the art, a variety of screws, bolts, pins and other devices can be utilized for the engaging device 104.

Figure 21:
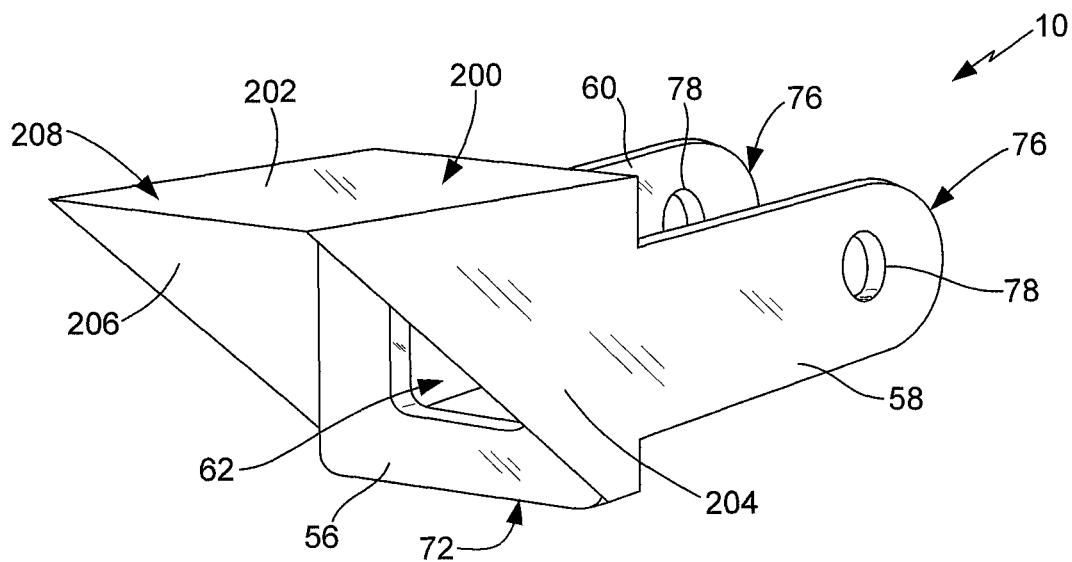
FIG. 21 is a right side perspective view of an alternative adapter for supporting an apparatus on a vehicle tow hitch assembly.
Figure 22:
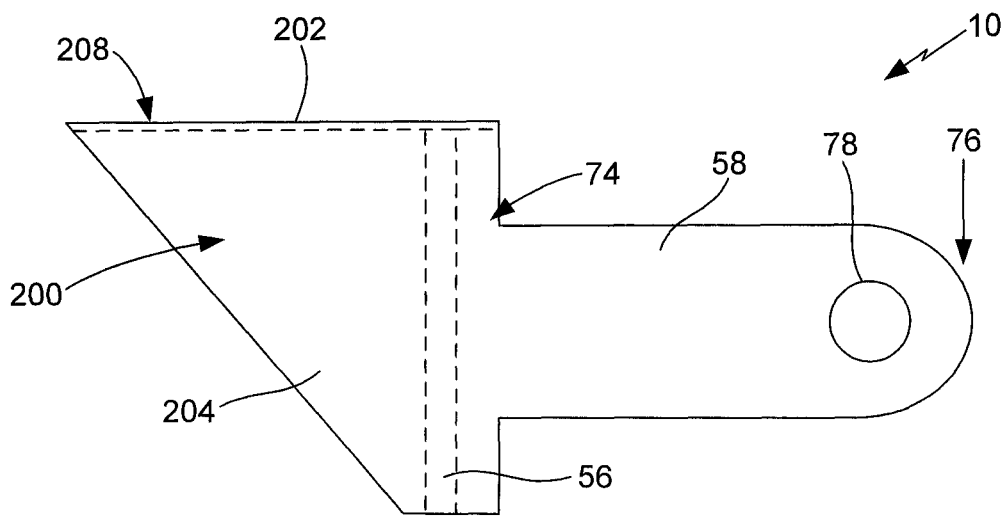
FIG. 22 is a right side view of the adapter of FIG. 21.

Another alternative embodiment of the adapter 10 of the present invention is shown in FIGS. 21 and 22. As with the above embodiments, the adapter 10 of this embodiment is supported by the tow hitch assembly 12 and adaptable for connection (whether by attachment or being integrally formed) with a useful apparatus 52 to be utilized with the vehicle 14 by itself or to enable the vehicle 14 to carry one or more items 54. In this configuration, the adapter 10 is configured somewhat similar to the embodiment of FIGS. 1 through 4 except that it has an extension section 200 comprising a top extension member 202 and a pair of side extension members, shown as 204 and 206 in FIG. 21, that are integrally formed or attached to forwardly extending arms 58/60 so as to extend rearwardly of the adapter collar 56. Top extension member 202 of extension section 200 is integral with or attached to the top side 70 of adapter collar 56 and the side extension members 204/206 are integral with or attached to first side 66 and second side 68, respectively, to define a plurality of extension surfaces 208 on the top extension member 202 and the side extension members 204/206 at which the useful apparatus 52 can attach to the adapter 10. In this embodiment, the collar opening 62 is sized and configured to fit over and be supported by the standard hitch shaft 24, but sides 66, 68 and 70 are not utilized to attach to useful apparatus 52. Instead, useful apparatus 52 attaches to outer extension surfaces 208, bottom side 72 and/or arms 58/60. It is believed that the extension section 200 can be formed from a single piece of metal by bending a simple pattern to shape and then welding adapter collar 56 to the inside of the extension section 200. In use, adapter collar 56 engages the tow hitch assembly 12 as described above to secure the adapter 10 to the tow hitch assembly 12.

As set forth above, the adapter 10 is utilized to support a useful apparatus 52 on the tow hitch assembly 12 of a vehicle 14 so useful apparatus 52 can be utilized with the vehicle 14 and/or utilized to carry one or more items 54 so the items 54 may be transported by vehicle 14. In the embodiment shown in FIG. 5, utilizing the adapter 10 shown in FIGS. 1 through 4, the useful apparatus 52 is a bicycle rack 110 and the items 54 are bicycles 112 and 114. The adapter 10 is attached to or integral with one or more components of the bicycle rack 110 so the bicycle rack 110 can be supported by adapter 10 on the tow hitch assembly 12 of vehicle 14 in a manner that allows the tow hitch assembly 12 to also be utilized to tow a towable vehicle 16. In this embodiment, the bicycle rack 110 has a first frame member 116 that attaches to or is integral with the adapter 10 and extends upward therefrom a sufficient distance to allow tow tongue 40 to engage the hitch ball 38, as shown in FIG. 5. A second frame member 118 extends rearwardly and generally horizontally from the first frame member 116 to define a carrying space 120 for bicycles 112/114 behind the vehicle 14 without interfering with the towing or other movement of towable vehicle 16. In the embodiment shown, the second frame member 118 is integral with the first frame member 116. Alternatively, the two frame members 116/118 can be connected utilizing frame connecting mechanisms well known in the art. An elbow member 122 connects the second frame member 118 with a third frame member 124 that extends upwardly in a generally vertical orientation from the second frame member 118 a sufficient distance to allow the bicycles 112/114 to be positioned above the second frame member 118 in the carrying space 120 so the tires 126 do not contact second frame member 118, as shown in FIG. 5. As shown in the figure, fourth frame member 128 extends forwardly and generally horizontally from third frame member 124 across the carrying space 120. In this embodiment, the fourth frame member 128 is integral with the third frame member 124. In an alternative embodiment, the two frame members 124/128 are connected. In another embodiment, one or more of the frame members, such as second frame member 118, can be telescopically configured to also ease the movement of bicycles 112/114 onto or off of bicycle rack 110. A bicycle securing mechanism 130 attached to fourth frame member 128 is utilized to secure bicycles 112/114 to the bicycle rack 110 so they may be securely and safely transported by vehicle 14. In one embodiment, one or more portions of the bicycle rack 110 utilize commercially available bicycle rack components. For instance, the third frame member 124, fourth frame member 128 and the bicycle securing mechanism 130 are generally available as a single unit that is a part of a number of prior art bicycle rack systems.

Figure 16:
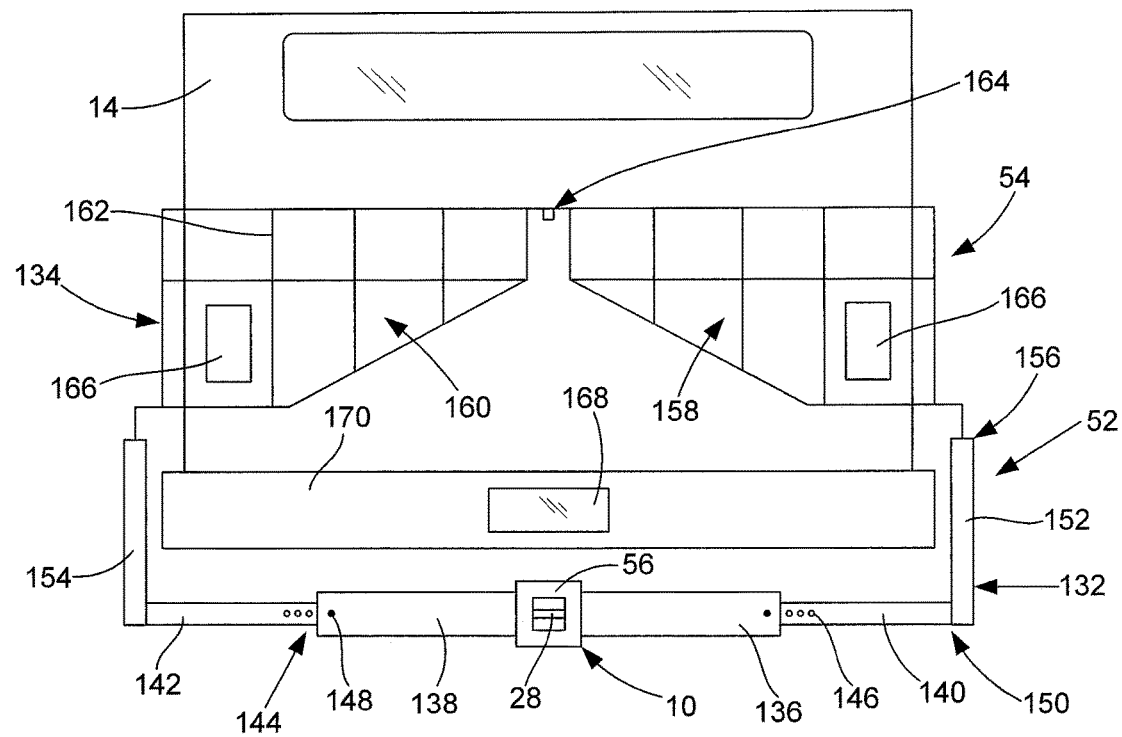
FIG. 16 is a back view of an adapter shown in use on a vehicle having a tow hitch assembly to support an apparatus configured as a pair of gates at the rear of the vehicle.
Figure 17:
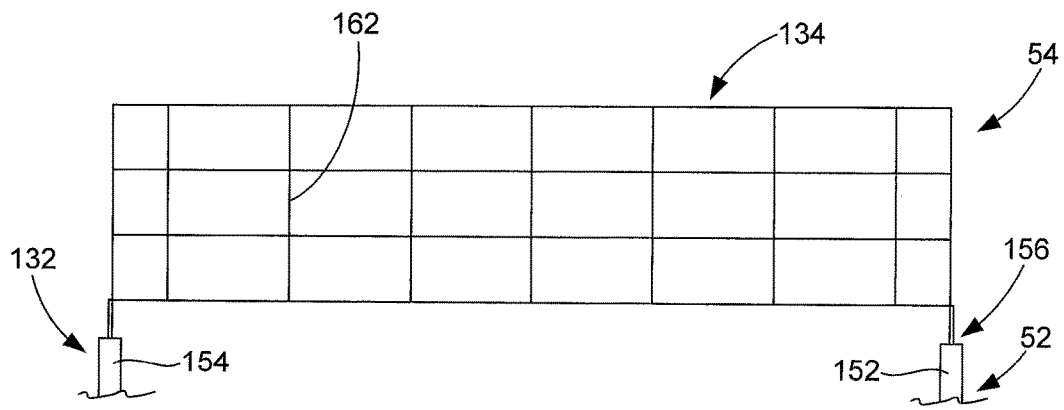
FIG. 17 is a back view of an apparatus configured as a barrier for use at the rear of the vehicle.

As shown in FIG. 16, the useful apparatus 52 can be a carrier apparatus 132 that is attached to or integral with adapter 10 and is utilized, as shown in FIGS. 16 through 20, to carry one or more items 54. In FIG. 16, the item 54 is a gate assembly 134 that pivotally attaches to the carrier apparatus 132 to selectively close off or allow access to the area behind the gate assembly 134, such as the bed of a truck or the like. The carrier apparatus 132 comprises a pair of primary support arms 136 and 138 that extend outward generally horizontally along the width of vehicle 14 from adapter 10. Each primary support arm 136/138 attaches to a carrier arm 140/142 that is associated therewith to extend the full width of vehicle 14. To allow for different widths of vehicles 14, preferably each of the carrier arms 140/142 are telescopically attached to their respective primary support arm 136/138 utilizing a telescoping mechanism 144. In the configuration of FIG. 16, the telescoping mechanism 144 comprises a plurality of apertures 146 on each of the carrier arms 140/142 that are sized and configured to removably receive an engaging pin 148 to lock the carrier arms 140/142 to their respective primary support arms 136/138. At the distal end 150 of each carrier arm 140/142 is provided a vertical section, shown as 152 and 154 respectively, that extends generally upward from the horizontal sections of carrier arms 140/142. The gate assembly 134 pivotally attaches to the upper end 156 of the vertical sections 152/154 of each carrier arm 140/142. In the embodiment of FIG. 16, the gate assembly 134 comprises a first gate section 158 and a second gate section 160 that are each made up of a plurality of gate frame members 162. In a preferred configuration, a locking mechanism 164 secures the two gate sections 158/160 together when the gate assembly 134 is in its closed condition, as shown in FIG. 16. Preferably, the various gate frame members 162 are assembled so as to not interfere with being able to see the tail lights 166 and the vehicle license plate 168. In addition, the gate frame members 162 should be configured so the vehicle bumper 170 does not interfere with the operation of the gate assembly 134. Many different configurations of gate assembly 134 will be suitable for use with the adapter 10 of the present invention. For instance, FIG. 17 shows a gate assembly 134 that is made up of a single gate section. The gate assembly 134 of FIG. 17 can be configured so that one end of the gate assembly 134 pivots outwardly at the upper end 156 of one of vertical sections 152/154 to swing open or closed, both ends of gate assembly 134 pivot downward at the upper ends 156 of vertical sections 152/154 or gate assembly 134 can be fixed in position (no swinging or pivoting of gate assembly 134. Other configurations for the operation of gate assembly 134 may also be possible.

Figure 18:
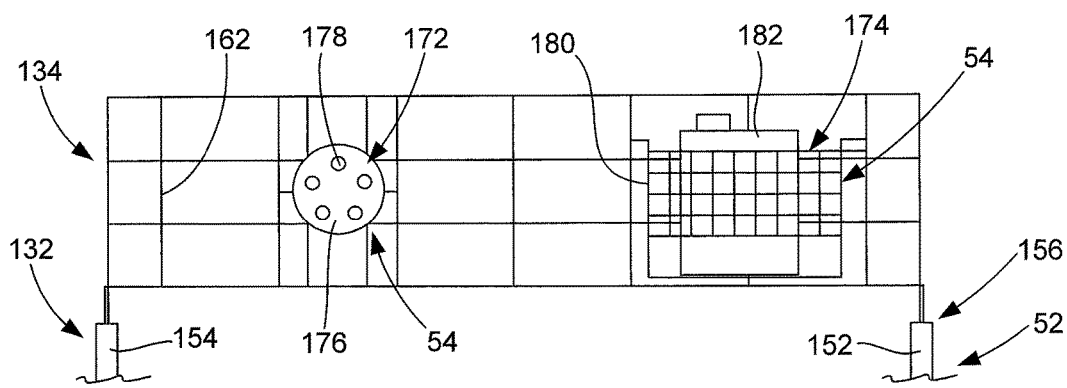
FIG. 18 is a back view of the apparatus of FIG. 17 shown in use supporting a tire mount and a storage bin, with the storage bin holding a fuel container.

The embodiment of FIG. 18 shows use of the gate assembly 134 of FIG. 17 to support a tire mount 172 and a storage bin 174 thereon as the items 54. Tire mount 172 can be configured with a support plate 176 having a plurality of outwardly extending lugs 178 that are sized and configured to receive the wheel so the user can carry a spare tire on gate assembly 134 to have available for vehicle 14 in case the spare tire is needed. In one embodiment, storage bin 174 can be made up of a plurality of bin frame members 180 that are configured to support various objects therein, such as a fuel container 182 that stores extra gasoline or other fuel for vehicle 14 or for a lawnmower, stove or other fuel consuming equipment so the fuel container 182 will not have to be carried inside the vehicle 14 or a trunk or bed associated with vehicle 14. In an alternative embodiment, panels or other structural members can be utilized instead of or in conjunction with the bin frame members 180 to define the storage bin 174. Storage bin 174 can be utilized to carry a wide variety of different objects.

Figure 19:
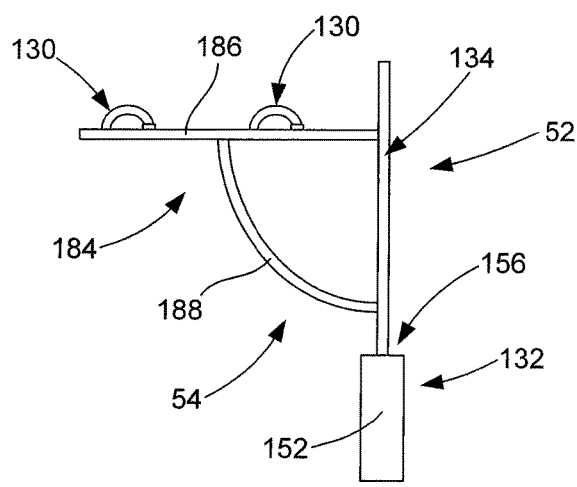
FIG. 19 is a side view of the apparatus of FIG. 17 shown in use supporting a bicycle rack.
Figure 20:
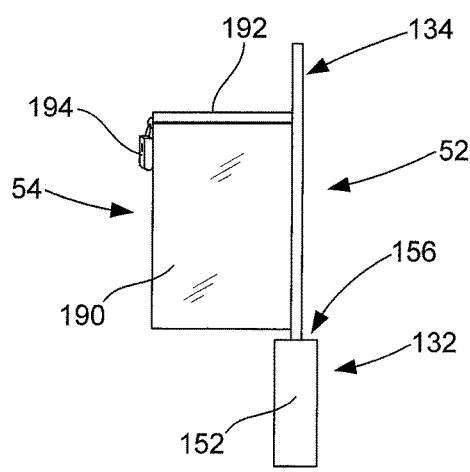
FIG. 20 is a side view of the apparatus of FIG. 17 shown in use supporting a tool box or like enclosed container.

The embodiment shown in FIG. 19 is a side view of a bicycle rack 184 having a different configuration than the bicycle rack 110 of FIG. 5. In this configuration, the bicycle rack 184 has two or more horizontal members 186 that extend rearwardly and horizontally from the gate assembly 134 of FIG. 17 and a brace member 188 that interconnects the horizontal member 186 and the gate frame members 162 to support the horizontal member 186 so that it may support one or more bicycles 112/114 thereon at the bicycle securing mechanisms 130 on the horizontal member 186. If desired, presently available bicycle racks, in whole or part, can be utilized for bicycle rack 184. Other configurations for bicycle rack 184 are also adaptable for use with the adapter 10 of the present invention. FIG. 20 shows an embodiment of the present invention where the gate assembly 134, as the useful apparatus 52, supported by the carrier apparatus 132 is utilized to support and carry a large tool box 190 so that tool box 190 may be transported by vehicle 14. In the embodiment shown in FIG. 20, the tool box 190 has a lid 192 that pivots open and closed and has a lock or other locking mechanism 194 to secure the tools and other materials inside the tool box 190. For use with either bicycle rack 184 or tool box 190, the gate assembly 134 can be configured to pivot relative to the carrier apparatus 132 to allow the user to swing the gate assembly open and closed relative to vehicle 14. As set forth above, the adapter 10 can be configured to supportedly carry a wide variety of other useful apparatuses 52 that can be used to moveably support one or more items 54 so the useful apparatus 52 can be used with vehicle 14 and/or the various items 54 can be transported by vehicle 14.

While there are shown and described herein a specific form of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there are numerous components described herein that can be replaced with equivalent functioning components to accomplish the objectives of the present invention.

What is claimed is:

1. An adapter for supporting a useful apparatus on a tow hitch assembly having a hitch shaft removably received in a generally rearwardly facing tube opening of a receiver attached to a vehicle, said adapter comprising:
    an adapter collar having a collar opening through said adapter collar and one or more outer sides, said collar opening defined by one or more interior sidewalls, said collar opening sized and configured to be received on and engage said tow hitch assembly without interfering with the ability of said hitch shaft to be received in said tube opening of said receiver so as to allow said tow hitch assembly to be utilized to simultaneously tow a towable vehicle, said interior sidewalls of said collar opening being dimensioned in corresponding relation to a receiver collar located at or near said tube opening of said receiver so as to tightly engage said receiver collar;
    a bottom extension member extending generally forward from said adapter collar over said receiver;
    a pair of arms attached to or integral with said adapter collar and positioned so as to extend generally parallel to said receiver and to said hitch shaft when said adapter is received on said tow hitch assembly, each of said pair of arms having a proximal end at said adapter collar and a distal end extending generally forwardly from said adapter collar, each of said pair of arms having an arm aperture disposed generally toward said distal end thereof, each of said arm apertures positioned on said arms so as to be aligned in corresponding relation to a pair of receiver apertures on said receiver and to a pair of hitch apertures on said hitch shaft when said adapter is received on said tow hitch assembly and said hitch shaft is received in said tube opening of said receiver, said useful apparatus attached to or integral with at least one of said outer sides of said adapter collar and/or one or more of said pair of arms; and
    a locking device sized and configured to be received through each of said arm apertures of said pair of arms and through each of said receiver apertures and said hitch apertures of said tow hitch assembly to removably secure said adapter and said useful apparatus to said tow hitch assembly to allow transport thereof by the vehicle.

2. The adapter of claim 1, wherein each of said pair of arms are sufficiently spaced apart on said adapter collar to extend over and past a receiver collar located at or near said tube opening of said receiver.

3. The adapter of claim 1, wherein a bottom side of said adapter collar has a gap sized and configured to receive a gusset at or near a second end of said hitch shaft.

4. The adapter of claim 1, wherein said interior sidewalls of said collar opening are dimensioned in corresponding relation to said hitch shaft so as to tightly engage said hitch shaft.

5. The adapter of claim 1 further comprising an engaging means associated with said bottom extension member for engaging said receiver so as to level said adapter and/or lock said adapter to said hitch assembly.

6. The adapter of claim 1 further comprising an extension section having a top extension member and a pair of side extension members, said top extension member and said pair of side extension members defining a plurality of extension surfaces, said useful apparatus attached to or integral with one or more of said extension surfaces and/or one or more of said pair of arms.

7. The adapter of claim 1, wherein said useful apparatus is a bicycle rack configured to support one or more bicycles thereon.

8. The adapter of claim 7, wherein said bicycle rack comprises a first frame member extending generally upward from said adapter.

9. The adapter of claim 1, wherein said useful apparatus is a carrier apparatus configured to carry one or more items thereon.

10. The adapter of claim 9, wherein said carrier apparatus comprises a pair of elongated primary support arms that extend outwardly in opposite directions from said adapter, a carrier arm extending outwardly from each of said primary support arms and a vertical section extending upward from a distal end of each of said carrier arms.

11. The adapter of claim 10, wherein each of said carrier arms is telescopically connected to its respective said primary support arm.

12. The adapter of claim 10, wherein said item is a gate assembly pivotally attached to an upper end of each of said vertical sections, said gate assembly comprising a plurality of gate frame members.

13. The adapter of claim 12 further comprising at least one of a tire mount, a storage bin, a bicycle rack and a tool box attached to said gate assembly.

14. An adapter for supporting a useful apparatus on a tow hitch assembly having a hitch shaft removably received in a generally rearwardly facing tube opening of a receiver attached to a vehicle, said adapter comprising:
    an adapter collar having a collar opening through said adapter collar and one or more outer sides, said collar opening sized and configured to be received on and engage one of said hitch shaft and said receiver of said tow hitch assembly without interfering with the ability of said hitch shaft to be removably received in said tube opening of said receiver so as to allow said tow hitch assembly to be utilized to simultaneously tow a towable vehicle;
    a bottom extension member extending generally forward from said adapter collar and an engaging means associated with said bottom extension member for engaging said receiver so as to level said adapter and/or lock said adapter to said hitch assembly when said adapter is received on said tow hitch assembly;
    a pair of spaced apart arms attached to or integral with said adapter collar and positioned so as to extend generally along said receiver and said hitch shaft when said adapter is received on said tow hitch assembly, each of said pair of arms having a proximal end at said adapter collar and a distal end extending generally forwardly from said adapter collar, each of said pair of arms having an arm aperture disposed generally toward said distal end thereof, each of said arm apertures positioned on said arms so as to be aligned in corresponding relation to a pair of receiver apertures on said receiver and to a pair of hitch apertures on said hitch shaft when said adapter is received on said tow hitch assembly and said hitch shaft is received in said tube opening of said receiver, said useful apparatus attached to or integral with at least one of said outer sides of said adapter collar and/or one or more of said pair of arms; and a locking device sized and configured to be received through each of said arm apertures of said pair of arms and through each of said receiver apertures and said hitch apertures of said tow hitch assembly to removably secure said adapter and said useful apparatus to said tow hitch assembly to allow transport thereof by the vehicle.

15. The adapter of claim 14 further comprising a receiver collar on said receiver at or near said tube opening thereof, said collar opening having one or more interior sidewalls dimensioned in corresponding relation to one of said hitch shaft and said receiver collar so as to allow said collar opening to tightly engage said hitch shaft or said receiver collar.

16. The adapter of claim 14, wherein said useful apparatus is a carrier apparatus configured to carry one or more items thereon, said carrier apparatus having a pair of elongated primary support arms that extend outwardly in opposite directions from said adapter, a carrier arm extending outwardly from and telescopically connected to each of said primary support arms and a vertical section extending upward from a distal end of each of said carrier arms.

17. The adapter of claim 14 further comprising an extension section having a top extension member and a pair of side extension members extending rearwardly of said adapter collar, said top extension member and said pair of side extension members defining a plurality of extension surfaces, said useful apparatus attached to or integral with one or more of said extension surfaces and/or one or more of said pair of arms.

18. An adapter for supporting a carrier apparatus on a tow hitch assembly having a hitch shaft removably received in a generally rearwardly facing tube opening of a receiver attached to a vehicle, with the carrier apparatus configured to carry one or more items thereon, said adapter comprising:

an adapter collar having a collar opening through said adapter collar and one or more outer sides, said collar opening defined by one or more interior sidewalls, said collar opening sized and configured to be received on and engage said tow hitch assembly without interfering with the ability of said hitch shaft to be received in said tube opening of said receiver so as to allow said tow hitch assembly to be utilized to simultaneously tow a towable vehicle;

a pair of arms attached to or integral with said adapter collar and positioned so as to extend generally parallel to said receiver and to said hitch shaft when said adapter is received on said tow hitch assembly, each of said pair of arms having a proximal end at said adapter collar and a distal end extending generally forwardly from said adapter collar, each of said pair of arms having an arm aperture disposed generally toward said distal end thereof, each of said arm apertures positioned on said arms so as to be aligned in corresponding relation to a pair of receiver apertures on said receiver and to a pair of hitch apertures on said hitch shaft when said adapter is received on said tow hitch assembly and said hitch shaft is received in said tube opening of said receiver, said carrier apparatus attached to or integral with at least one of said outer sides of said adapter collar and/or one or more of said pair of arms; and a locking device sized and configured to be received through each of said arm apertures of said pair of arms and through each of said receiver apertures and said hitch apertures of said tow hitch assembly to removably secure said adapter and said carrier apparatus to said tow hitch assembly to allow transport thereof by the vehicle, wherein said carrier apparatus comprises a pair of elongated primary support arms that extend outwardly in opposite directions from said adapter, a carrier arm extending outwardly from each of said primary support arms and a vertical section extending upward from a distal end of each of said carrier arms.

19. The adapter of claim 18, wherein said interior sidewalls of said collar opening are dimensioned in corresponding relation to a receiver collar located at or near said tube opening of said receiver so as to tightly engage said receiver collar.

20. The adapter of claim 18 further comprising a bottom extension member extending generally forward from said adapter collar over said receiver.

21. The adapter of claim 18, wherein said item is a gate assembly pivotally attached to an upper end of each of said vertical sections, said gate assembly comprising a plurality of gate frame members.

* * * * *